US008117451B2

United States Patent
Endoh

(10) Patent No.: US 8,117,451 B2
(45) Date of Patent: Feb. 14, 2012

(54) DEVICE CONTROLLER, METHOD FOR CONTROLLING A DEVICE, AND PROGRAM THEREFOR

(75) Inventor: Takashi Endoh, Yamato (JP)

(73) Assignee: Kyocera Corporation, Kyoto (JP)

( * ) Notice: Subject to any disclaimer, the term of this patent is extended or adjusted under 35 U.S.C. 154(b) by 1179 days.

(21) Appl. No.: 11/439,499

(22) Filed: May 22, 2006

(65) Prior Publication Data

US 2006/0265757 A1 Nov. 23, 2006

(30) Foreign Application Priority Data

May 23, 2005 (JP) .................... 2005-149746

(51) Int. Cl.
*H04L 9/32* (2006.01)
*G06F 3/00* (2006.01)
*G06F 9/44* (2006.01)
*G06F 9/46* (2006.01)
*G06F 13/00* (2006.01)

(52) U.S. Cl. ........................ 713/170; 719/321
(58) Field of Classification Search .......... 713/168–170; 719/321
See application file for complete search history.

(56) References Cited

U.S. PATENT DOCUMENTS

| | | | |
|---|---|---|---|
| 4,916,653 A | | 4/1990 | Johri et al. |
| 5,815,707 A | | 9/1998 | Krause et al. |
| 5,893,926 A | * | 4/1999 | Saxena et al. ............. 711/170 |
| 5,968,136 A | * | 10/1999 | Saulpaugh et al. ............ 710/3 |
| 6,725,345 B2 | | 4/2004 | Baba et al. |
| 6,807,582 B1 | * | 10/2004 | Muschenborn ............ 709/252 |
| 7,346,808 B2 | * | 3/2008 | Srinivasan et al. ............. 714/27 |
| 7,624,439 B2 | * | 11/2009 | Koestler ........................ 726/16 |
| 2001/0034839 A1 | * | 10/2001 | Karjoth et al. ............... 713/190 |
| 2001/0037301 A1 | * | 11/2001 | Shepley et al. ................. 705/43 |
| 2001/0056494 A1 | * | 12/2001 | Trabelsi ....................... 709/229 |
| 2003/0089675 A1 | * | 5/2003 | Koestler ....................... 213/201 |
| 2003/0120935 A1 | * | 6/2003 | Teal et al. ..................... 713/188 |
| 2004/0123108 A1 | * | 6/2004 | Winkler et al. .............. 713/176 |

(Continued)

FOREIGN PATENT DOCUMENTS

CN 1154392 C 6/2004

(Continued)

OTHER PUBLICATIONS

Chinese language office action and its English language translation for corresponding Chinese application 200610084869.4 lists the reference above.

(Continued)

*Primary Examiner* — Christian Laforgia
(74) *Attorney, Agent, or Firm* — DLA Piper LLP (US)

(57) ABSTRACT

A device controller for controlling a device, comprises: a sending section that sends a message from an execution object to an operation section; and a control section that controls the device according to a procedure that is preset corresponding to the message in response to the message, wherein the sending section comprises: an evaluation section that generates an indication indicating reliability of the execution object in response to receiving the message from the execution object; and an indication attachment section that attaches the indication to the received message, a storage section that stores a plurality of procedures corresponding to indications, and the control section is configured to check the indication in response to receiving the message, and to execute a given procedure from the plurality of procedures stored in the storage section.

5 Claims, 6 Drawing Sheets

U.S. PATENT DOCUMENTS

| | | | |
|---|---|---|---|
| 2004/0199763 A1* | 10/2004 | Freund | 713/154 |
| 2005/0085222 A1* | 4/2005 | Przybilski et al. | 455/418 |
| 2005/0138211 A1* | 6/2005 | Cheng | 709/250 |
| 2005/0246722 A1* | 11/2005 | Shier et al. | 719/321 |
| 2006/0123424 A1* | 6/2006 | Hunt et al. | 719/310 |
| 2006/0277598 A1* | 12/2006 | Ahn | 726/5 |
| 2006/0288214 A1* | 12/2006 | Dutta et al. | 713/173 |
| 2007/0280480 A1* | 12/2007 | Chong | 380/270 |
| 2008/0184123 A1* | 7/2008 | Shuqair et al. | 715/733 |

FOREIGN PATENT DOCUMENTS

| | | |
|---|---|---|
| JP | 01233543 A | 9/1989 |
| JP | 09-218844 | 8/1997 |
| JP | 2001243079 A | 9/2001 |
| JP | 2001337864 A | 12/2001 |
| JP | 2002247548 A | 8/2002 |
| JP | 2003034061 A | 2/2003 |
| JP | 2004185531 A | 7/2004 |
| JP | 2004318720 A | 11/2004 |
| JP | 2005115487 A | 4/2005 |
| WO | 0025546 A1 | 5/2000 |

OTHER PUBLICATIONS

Japanese language office action dated Sep. 7, 2010 and its English language translation for corresponding Japanese application 2005149746 lists the references above.

* cited by examiner

DEVICE CONTROLLER, METHOD FOR CONTROLLING A DEVICE, AND PROGRAM THEREFOR

BACKGROUND OF THE INVENTION

1. Field of the Invention

The present invention relates to a device controller that controls a device coupled to a computer, a method for controlling a device, and a program therefor.

Priority is claimed on Japanese Patent Application No. 2005-149746, filed May 23, 2005, the content of which is incorporated herein by reference.

2. Description of the Related Art

A device driver has been used for controlling a device that is connected to a computer. An operating system (OS) running on a computer provides a general-purpose interface for various device drivers. With the interface, when a new device is developed, this device is available from execution objects, such as application programs or the OS, by installing a device driver that supports the new device. A manufacturer of the device provides the device driver, and the OS provides application programs with the capability to control the device by means of a system call.

A system call of an OS takes a message as an argument, which is passed to a device driver. The device driver operates the device according to the passed message. For example, for writing a program for controlling the device in the C language, a system call, such as open( ), close( ), read( ), write( ), ioctl( ), or the like, is used. Such a system call controls, i.e., opens, closes, reads from, or writes into the device according to the message. Such system calls (i.e., functions) may provide similar functionalities on various OSs although names of the functions may vary depending on the OS or the execution environment. When a system call is called, a service of a kernel of the OS is invoked.

FIG. 7 is a block diagram showing a conventional device controller. A device 55 is operated by a device driver 562, which is linked to an OS 561. An application program 571 utilizes a high-level application programming interface (API) 572, which executes a system call 574. The OS 561 provides the system call 574 and the high-level API 572.

An interface of such a conventional device driver, which defines messages for the device driver and procedures to exchange messages to and from the device driver, has been publicly available in order to realize functionalities supported by the device. Furthermore, message interfaces have been standardized so that the same program can be executed for devices manufactured by different manufacturers without modifying the program, which has facilitated widespread use of devices.

When standardization of message interfaces is typically realized by defining a high-level API that is in a higher level than system calls, the high-level API is provided by the OS as a library or a dynamic link library (DLL). When an execution object calls the high-level API, the high-level API calls a system call to send a message to the device driver.

In general, a single instance of a device driver exists for a single device, and multiple instances of the high-level API exist for each application program. Such a single instance for each device driver is adapted in order to realize an exclusive access control in which a conflict is detected when multiple application programs try to control the device at the same time.

Portable telephone apparatuses have become available on the market which run such a general-purpose OS so that useful functionalities of the OS are utilized and various useful application programs running on the OS can connect to the wireless network of portable telephones and utilize the network.

In such apparatuses, a device that supports wireless telephone or data communication is coupled to a portable computer running the OS and an interface between the device and the OS is provided as a device driver. This technique offers various advantages. Examples include provision of publicly known means to control the device from an OS and application programs, and availability of a memory protection feature in an OS having such a memory protection feature that separates user spaces from the kernel space. In addition, portable telephone manufacturers can provide sophisticated functionalities while reducing the development cost of the OS. Furthermore, developers of OSs can eliminate extra labor to port an OS or application programs into different devices, thereby making latest high-performance devices available (see Japanese Unexamined Patent Application, First Publication No. H09-218844).

Device manufacturers and portable telephone manufacturers want to allow access to some functionalities of the device to the OS or trusted software programs while restricting the access from untrusted software programs, such as user applications, which is realized with a device controller or a method for controlling a device using conventional device drivers. That is, if usage of system calls, such as open( ), close( ), read( ), write( ), ioctl( ), by an execution program is permitted, even an untrusted software program can operate the device. For example, although operations that can interfere with the operation of the device, operations that charge fees to a user, or operations that read personal information of the user via an untrusted software program should be restricted, such a selective restriction was hard to be realized.

When a message interface between a device driver and an execution object is standardized, it is possible for the OS to restrict by usage of a certain message. However, when a device-specific functionality is utilized while restricting the usage thereof, the OS should handle respective conditions, which requires modification of the OS in many cases. Modification of the OS by the OS developer for restricting access to the device is not a practical solution.

SUMMARY OF THE INVENTION

An object of the present invention is to provide a solution that suitably enhances the flexibility in setting the access control by a device driver on a device to application programs while ensuring the versatility of a message interface.

In order to solve the above-identified problems, a first aspect of the present invention provides a device controller for controlling a device, comprising: a sending section that sends a message from an execution object to an operation section; and a control section that controls the device according to a procedure that is preset corresponding to the message in response to the message, wherein the sending section comprises: an evaluation section that generates an indication indicating reliability of the execution object in response to receiving the message from the execution object; and an indication attachment section that attaches the indication to the received message, a storage section that stores a plurality of procedures corresponding to indications, and the control section is configured to check the indication in response to receiving the message, and to execute a given procedure from the plurality of procedures stored in the storage section.

A second aspect of the present invention provides, in the above device controller, a device controller in which the sending section may further comprise an authentication attachment section that attaches an authentication to the message sent to the operation section, and the control section may determine a validity of the authentication in response to receiving the message from the sending section, and protect from an execution object when the validity of the authentication is not established.

Furthermore, a third aspect of the present invention provides a method for controlling a device, comprising: obtaining an indication indicating reliability of an execution object in response to receiving a message from the execution object; and sending the message to which the indication is attached; looking up the indication in response to receiving the message to which the indication is attached; and selecting a procedure to be executed from a plurality of procedures according to a reliability of the execution object.

Furthermore, a fourth aspect of the present invention provides a program for controlling a device, the program making a computer execute the steps of: receiving a message related to an operation of the device from an execution object; obtaining an indication indicating reliability of the execution object that sends the message; attaching the indication to the received message; and sending the message to the device.

Furthermore, a fifth aspect of the present invention provides a program for controlling a device, the program making a computer execute the steps of: receiving a message to which is attached an indication indicating a reliability of an execution object that sends a message related to an operation of the device; looking up the indication and selecting an operation procedure from a plurality of operation procedures that are set according to the reliability of the execution object for each message; and operating the device according to the selected operation procedure.

According to the present invention, upon sending the received message from the execution object to the operation section that operates the device, an indication indicating the reliability of the execution object is obtained and is attached to the message. The operation section is configured to select an operation procedure according to the reliability by looking up the indication. Accordingly, a general-purpose OS can be advantageously embedded into a computer and the device driver may be implemented to the system utilizing that OS.

That is, as for an advantage of the sending section, since it is suffice to provide the sending section with a functionality for obtaining the above-identified indication, it is suffice to execute a standardized procedure independent from the characteristics of the device and the sending section can be advantageously configured using an OS having standardized interfaces of execution objects and the device driver. Furthermore, as for an advantage of the operation section, the operation section can select processing procedures without being controlled by the execution object or the sending section, and the operation section can look up an indication indicating the reliability of the execution object upon selecting the processing procedure. Advantageously, it is therefore possible to build a device driver using the operation section, and a flexible countermeasure can be taken only with operations on the device driver against an unauthorized access to the device from the outside.

According to the above aspects, the reliability of an execution object that is a sender of a message can be obtained for each message, and the device driver can determine whether or not to provide the functionalities of the device. Furthermore, the device driver can select a detailed operation when the functionalities are provided. By this feature, it is possible to provide functionalities of the device only to trusted execution objects, limit the functionalities to untrusted execution objects, and to modify the functionalities as appropriate. Since such limiting or modification of the functionalities is determined by the device driver, it becomes possible to control the device based on policies adopted by manufacturer(s) of the device and/or the device driver without making a request to modify the OS.

Furthermore, it is possible to attach an electronic authentication to a message sent to the operation section from the sending section, thereby enhancing the protection against unauthorized access or the like. If the validity of the message from the sending section is not established, the operation section may take certain protection measures, such as not responding to the message by ignoring it, elevating a security level when such a level is set in the device driver or the like, prompting the sending section (i.e., the OS or the like) to strengthen the protection, for example.

The above configuration may be advantageous for building a system in that the device driver can detect an intention to maliciously operate the device by mimicking a message from the OS. In response to detecting such an attack, the device driver may transition to a higher security mode while notifying the OS of the attack for prompting the OS to strengthen its security.

DETAILED DESCRIPTION OF THE INVENTION

Hereafter, various embodiments of the present invention will be described with reference to the drawings.

Figure 3:
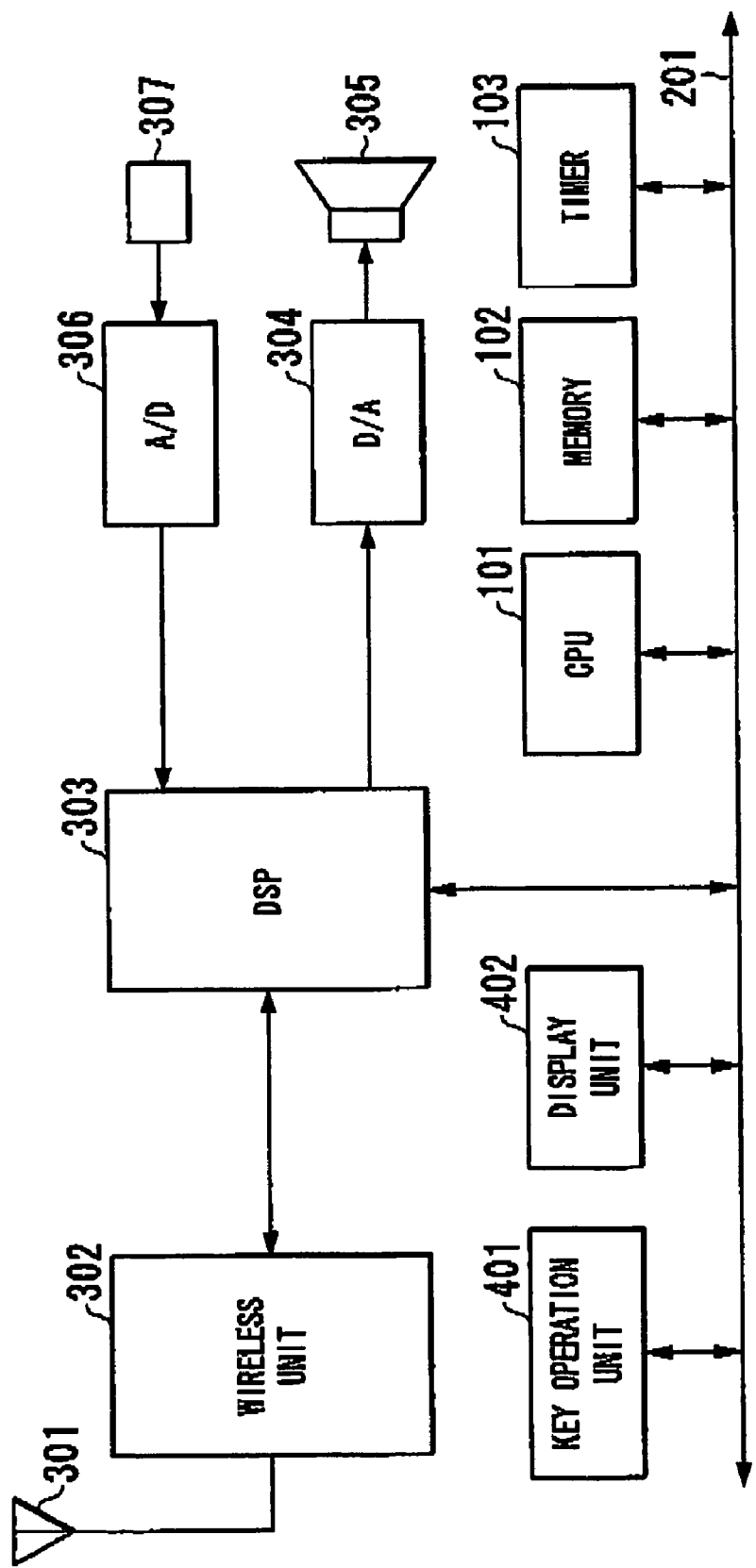
FIG. 3 is a block diagram showing an example of a circuit configuration of a portable telephone according to one embodiment of the present invention.

FIG. 3 is a block diagram showing an example of a circuit configuration of a portable telephone in which one embodiment of the present invention is applied. This portable telephone apparatus has a configuration having a central processing unit (CPU) 101 that governs the entire operation of the apparatus and various functional blocks wherein each functional block is connected to the CPU 101 via an internal bus 201. A memory 102 includes a random access memory (RAM) and a read only memory (ROM) and constructs a main memory of the CPU 101. A timer 103 is configured to execute various operations, such as starting at a specified time, according to instructions from the CPU 101.

An antenna 301 is configured to send or receive radio waves used for communication. A wireless unit 302 is configured to carry out communication using the antenna 301. A digital signal processor (DSP) 303 is configured to perform various operations, such as modulation and demodulation operation of sent or received signals. A digital/analog (D/A) converter 304 is configured to convert digital audio signals or ring tones output from the DSP 303 to analog audio signals which is sent to a speaker 305. A digital/analog (D/A) converter 306 is configured to convert analog audio signals input from a microphone 307 to digital audio signals, which is supplied to the DSP 303. The microphone 307 is configured to input voices of a caller or the like.

A key operation unit 401 includes keys, such as numeric keys, an on-hook key, an off-hook key, a power-on button, a shutter release button, function selection keys (function keys), for example, and is configured to capture key inputs of the keys. A display unit 402 includes a liquid crystal display panel or a liquid crystal touch panel, for example, and is configured to output various indications related to communication, messages, a menu screen, or execution screens of various application programs.

The portable telephone apparatus having the above-described configuration is capable of operating an application execution mode in addition to a voice call mode, as typical in portable telephone apparatuses. In the application execution mode, any application programs that are installed by a user can be started and executed.

Figure 1:
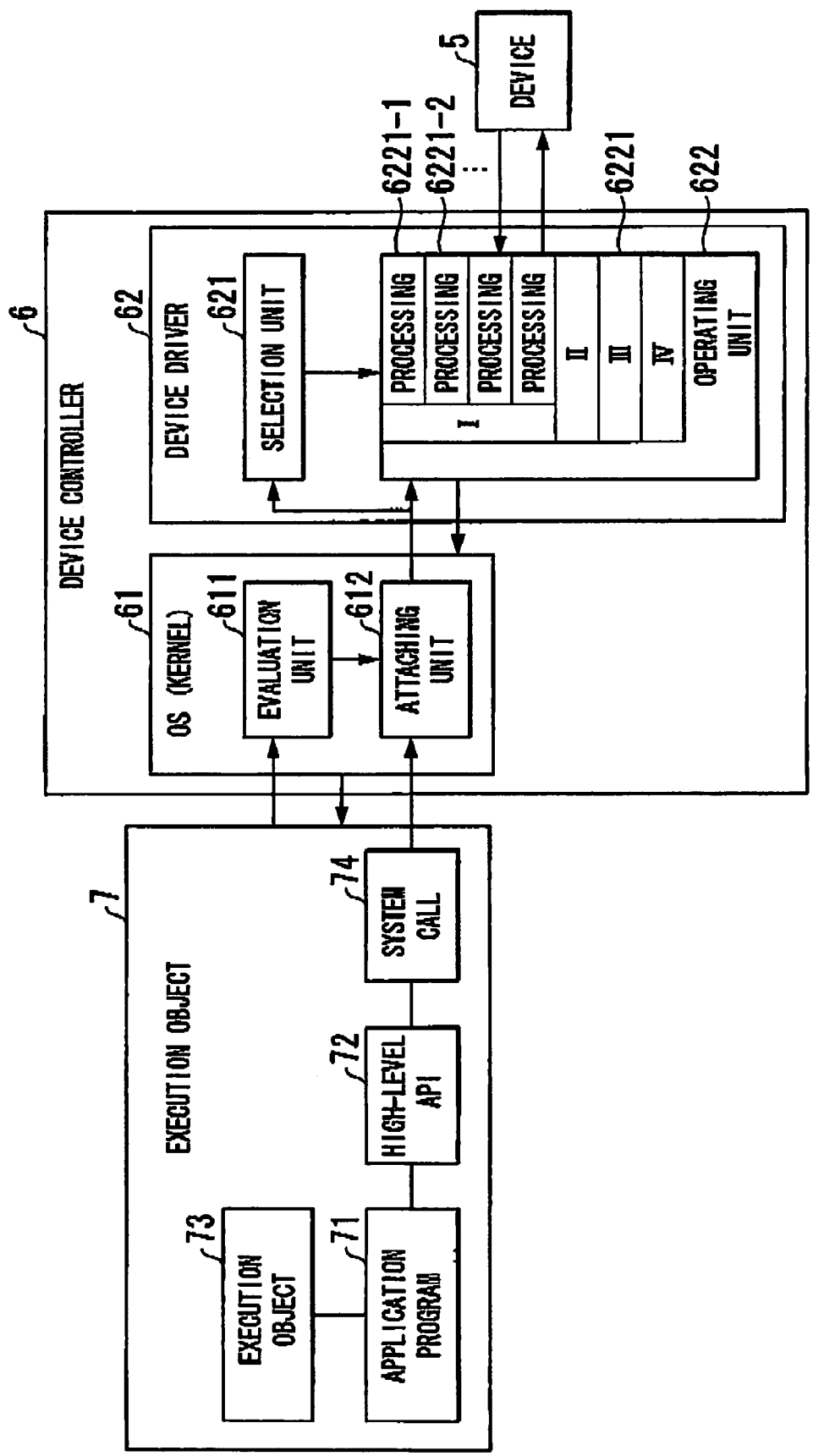
FIG. 1 is a detailed block diagram of a device controller according to the present invention.
Figure 2:
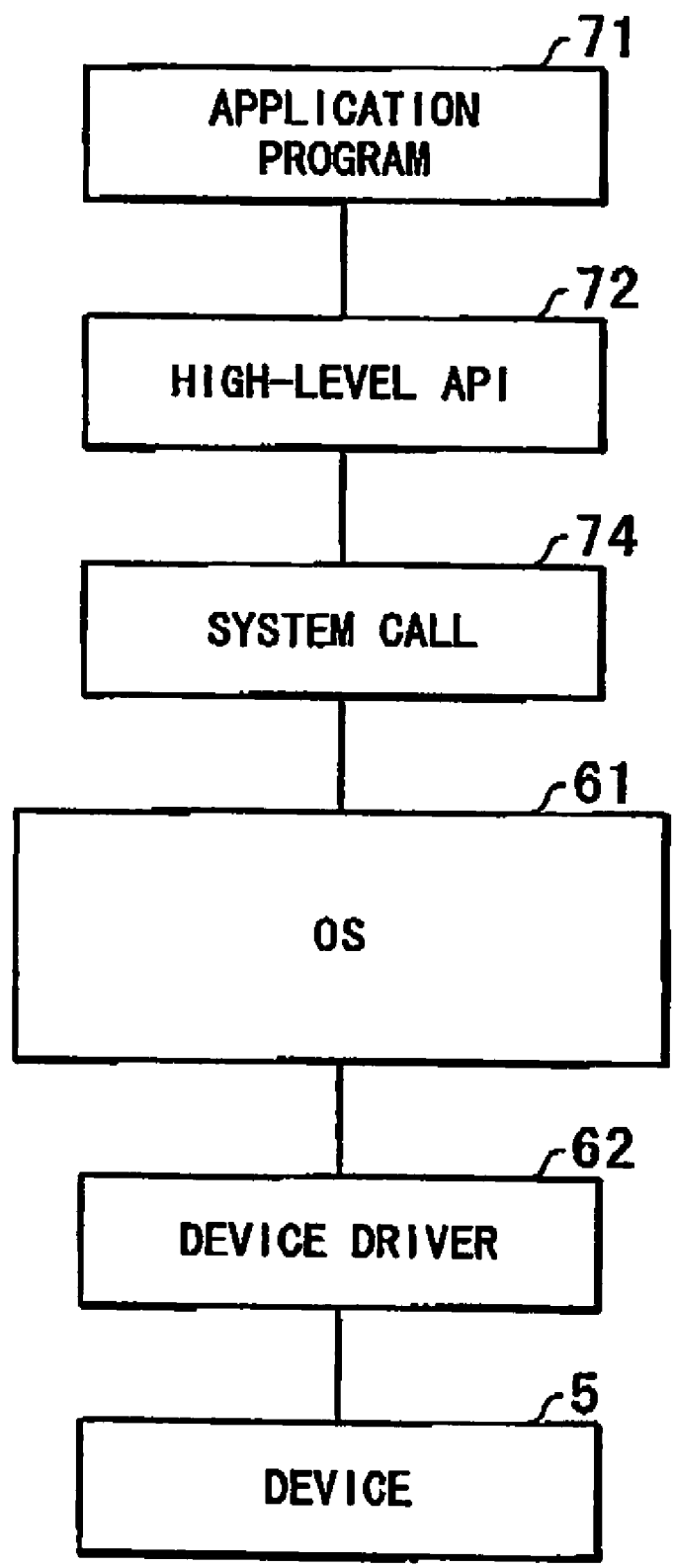
FIG. 2 is a summary block diagram of a device controller according to the present invention.

FIG. 1 is a detailed block diagram of a device controller according to one embodiment of the present invention. In this figure, reference numeral 5 denotes a device. Although only one device is illustrated, a plurality of devices may be used.

Reference numeral 6 denotes a device controller that controls the device 5, and reference numeral 7 denotes an execution object that sends messages to the device 5. The device controller 6 or the execution object 7 is realized by a cooperative operation between hardware resources, such as the CPU 101 or the memory 102 shown in FIG. 3, for example, and software resources, such as the OS, device driver programs implemented by the OS, and application programs installed in the OS.

An operating system (OS) 61 generates a process to execute an application program 71, as shown in FIG. 1. The application program 71 links to a high-level application program interface (API) 72, as well as linking an external execution object 73 that is downloaded at runtime download. The high-level API 72 further links to a system call 74. The system call 74 is a standard function for invoking a service of the kernel, and exists while being linked to a process of the application program 71. The application program 71, the high-level API 72, the execution object 73, and the system call 74 form the execution object 7 as a process instance of the application program 71.

As used herein, the term "execution object" refers to a set of executable programs. The execution objects may be application programs written by a user or a software manufacturer, libraries or DLLs provided by the OS, or objects obtained via a network or a medium. For example, the execution objects may be application programs, objects or DLLs dynamically linked at runtime, programs or scripts executed on interpreters, or objects of byte codes executed on a virtual machine. Furthermore, user processes or kernel processes linking to such objects can be regarded as execution objects.

When the application program 71 calls the high-level API 72, the high-level API 72 calls the system call 74 by specifying as an argument a suitable message for sending to the device driver 62. The system call 74 is a group of functions including open( ), close( ), read( ), write( ), ioctl( ), or the like, and the message is sent to the OS 61 by the ioctl( ) function. The OS (kernel) 61 includes an evaluation unit 611 that evaluates the execution object 7 before the message is sent to the device driver 62.

In the evaluation, a determination is made as to whether the execution object 7 is a user process or a kernel process of the OS 61. It is then determination whether the process is a known process or an unknown process. The extent of this determination is narrowed down by determining the operation mode of the process.

When the process is a known kernel process, the determination is immediately made by predetermining an evaluation value thereof. The evaluation values are unsigned 16-bit values in which the upper 8 bits represent a class and the lower 8 bits represent a detailed evaluation value within the class. Four types of class are defined: "known object," "unknown object with a digital signature," "unknown safe object," and "other object." Values of the upper 8 bits of the evaluation value other than these four types are reversed and invalid.

When the process is an unknown process, the evaluation unit 611 examines all execution objects to which the process instance links at that time, and sets the lowest evaluation value among the evaluation values of the execution object as the evaluation value of the execution object 7. In this example, since the application program 71, the high-level API 72, the execution object 73 that is dynamically linked, and the system call 74 have been linked, their evaluation values are examined and the lowest value is determined. Since the high-level API 72 and the system call 74 are DLLs provided by the OS 61, they are known, reliable objects which have higher evaluation values belonging to Class 1. Class 1 means a known object. Known objects are execution objects bundled to the OS 61 and their reliability is ensured by the OS 61.

The application program 71 has a low evaluation value under normal conditions since it is unknown. However, in some cases in which a signature of the creator or provider may be attached to increase the reliability, it is possible to set a slightly higher value belonging to Class 2 as its evaluation value. Class 2 means an unknown object with a digital signature. Although such an unknown object with a digital signature is unknown to the OS 61, the digital signature is provided and the object is an execution object whose signature is verified by the OS 61 and whose reliability is confirmed.

The execution object 73 that has been downloaded and dynamically linked is regarded as unsafe and its evaluation value is a low value belonging to Class 4. Class 4 means a tampered execution object or an execution object that is determined as unsafe based on certain determination criteria. An object of Class 4 is an execution object that is determined as having been tampered with as a result of verification of its digital signature or as unsafe based on determination criteria. Class 3 objects are unknown safe objects without a digital signature and are execution objects that have been determined as safe based on certain determination criteria.

The evaluation unit 611 uses the evaluation value of the execution object 73 as the evaluation value of the execution object 7. In the case of a network-oriented execution object that downloads required objects from a network for execution, no link is made until it is actually being called. In such an execution environment, objects that are linked change dynamically. Since it is impossible to evaluate all evaluation values of all of the objects being linked, the execution object is given a low evaluation value belonging to Class 4.

An attaching unit 612 sends the message to the device driver 62 after attaching an indication to the message. The device driver 62 includes a selection unit 621 that selects a procedure according to the indication attached to the message and an operating unit 622 that executes an operation to the device 5 for each message. The operating unit 622 is configured to look up an area 6221 in which procedures of processing have been stored. Suppose that there are four types of message, for example, the area is divided into four procedure categories: Category I to IV corresponding to each message type. In each procedure category, a plurality of procedure procedures 6221-1, 6221-2, . . . , are stored corresponding to the evaluation values.

The selection unit 621 looks up the indication and modifies actual procedure according to the indication. If the indication indicates that the execution object 7 is a kernel process and if the execution object 7 is known, the device driver 62 provides a wide variety of functionalities. When the execution object 7 is a kernel process but is unknown, its functionalities are limited. For example, when a device driver calls another device driver, it is an unknown kernel process. The indication indicates that the execution object 7 is a user process, the actual operations on the device 5 are modified according to the magnitude of the evaluation value and provided functionalities are limited. For example, by returning an error code while ignoring all operations on the device 5 corresponding to messages, the device 5 is prevented from controlling the execution object 7.

Figure 4:
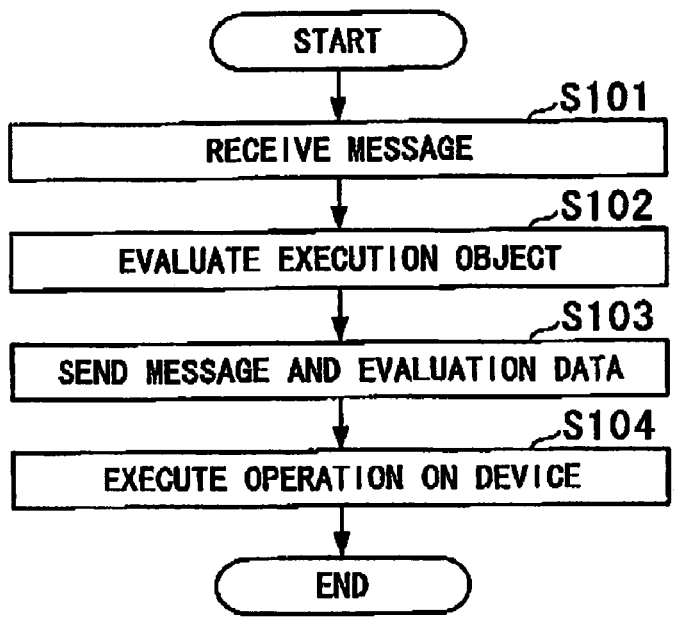
FIG. 4 is a flowchart showing a main flow of an OS according to one embodiment of the present invention.

FIG. 4 is a flowchart showing a main flow of an OS according to one embodiment of the present invention. With reference to FIGS. 1 and 4, a procedure for sending the OS 61 a message which the execution object 7 addresses to the device driver 62 is executed (S101). This is achieved by calling the ioctl( ) system call that is provided by the OS 61 to application programs. The ioctl( ) system call is a function that takes a descriptor of an opened device, a message, a pointer to input data, a pointer to output data as arguments, and returns "0" upon access and "−1" when an error occurs. It should be noted that the device 5 has been opened before executing the main flow shown in FIG. 4 and a valid descriptor of the device has been obtained. In ioctl( ), a service of the kernel of the OS 61 is invoked and the flow proceeds to step S102.

In step S102, the evaluation unit 611 included in the OS 61 evaluates the execution object 7 that is the originator of the message and generates an indication. The OS 61 looks up a process that is being executed at that time, and determines whether it is being executed in the kernel mode execution or executed in the user mode. Furthermore, it is determined whether or not the executing process is a known kernel process, and if it is a known process, a pre-determined indication is referred. If the executing process is an unknown process, an indication corresponding to the process is generated. At that time, it is determined whether a digital signature is attached, and if so, the signature is valid and is not tampered with. For unknown processes without a digital signature, the determination is made based on certain publicly disclosed determination criteria. Based on this determination, the object is classified into safe execution objects and other execution objects. In the indication, a flag indicating the execution mode of the process, the evaluation value, identification information and reliability information of the execution object determining the evaluation value in that process are included.

The flow then proceeds to step S103. In step S103, the OS 61 carries out a procedure for sending the message and the indication to the device driver 62. The OS 61 has a management table to which device drivers are registered and is able to invoke the device driver 62 specified by the descriptor according to the device 5.

Figure 5:
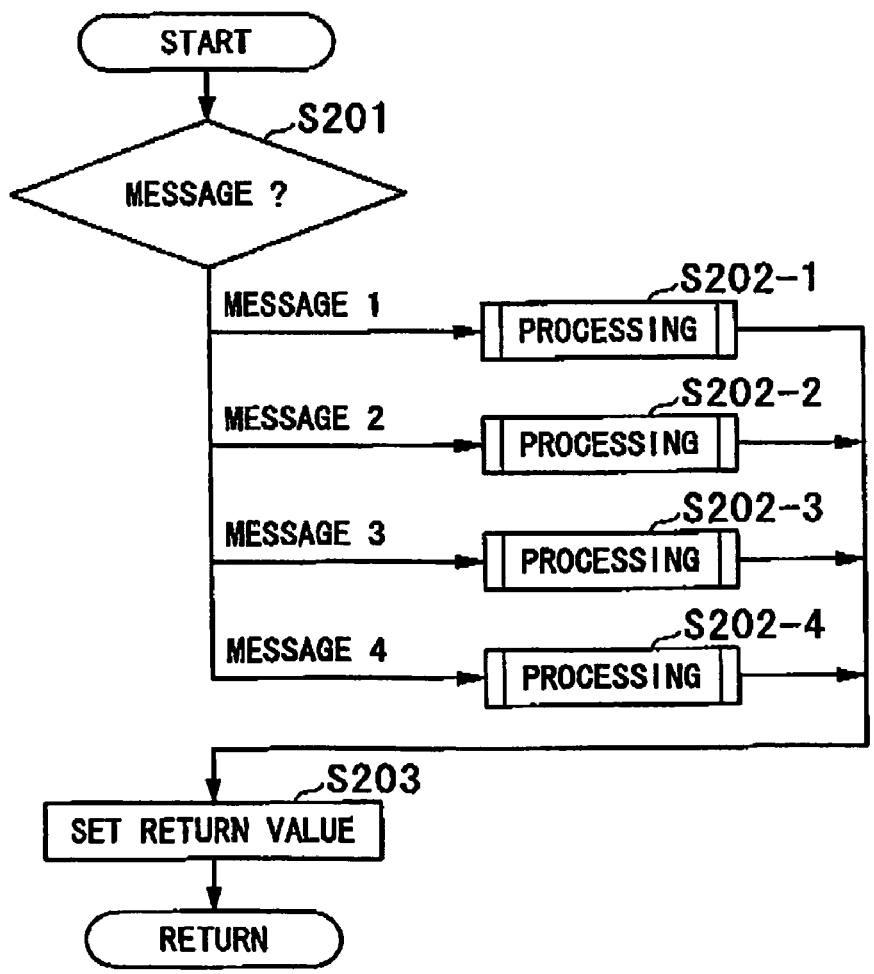
FIG. 5 is a flowchart showing a process flow of the device driver.

The flow then proceeds to step S104. In step S104, the device driver 62 executes an operation on the device 5 while modifying the operation based on the message and the indication. FIG. 5 is a flowchart showing a process flow of the device driver. Referring to FIGS. 1 and 5, the device driver 62 first selects a given procedure according to the message specified as an argument (S201). If the message in the argument is Message 1, a first procedure (S202-1) is executed. If the message in the argument is Message 2, a second procedure (S202-2) is executed. If the message in the argument is Message 3, a third procedure (S202-3) is executed. If the message in the argument is Message 4, a fourth procedure (S202-4) is executed. Any number of the messages and any number of procedures required for controlling the device may be used.

In the first to fourth procedures (S202-1-202-4), as described hereafter in detail, the device 5 is operated while modifying the operation based on the indication. When one of the first to fourth procedures (S202-1 through S202-4) returns, step S203 is executed. In step S203, the return value of one of the first to fourth procedures (S202-1 through S202-4) is set to a return value as a result of the procedure shown in FIG. 5. The return value is "0" when no error occurs and "−1" upon error.

Figure 6:
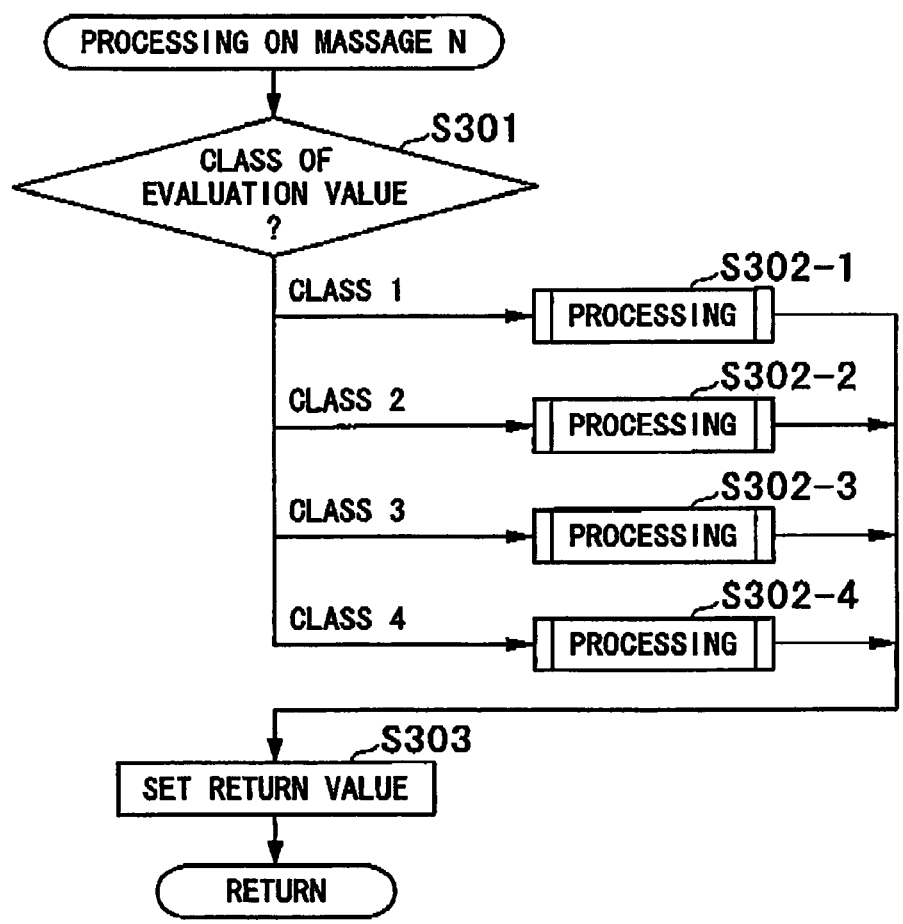
FIG. 6 is a flowchart showing a specific example of the flow of the first to fourth processes shown in FIG. 5.
Figure 7:
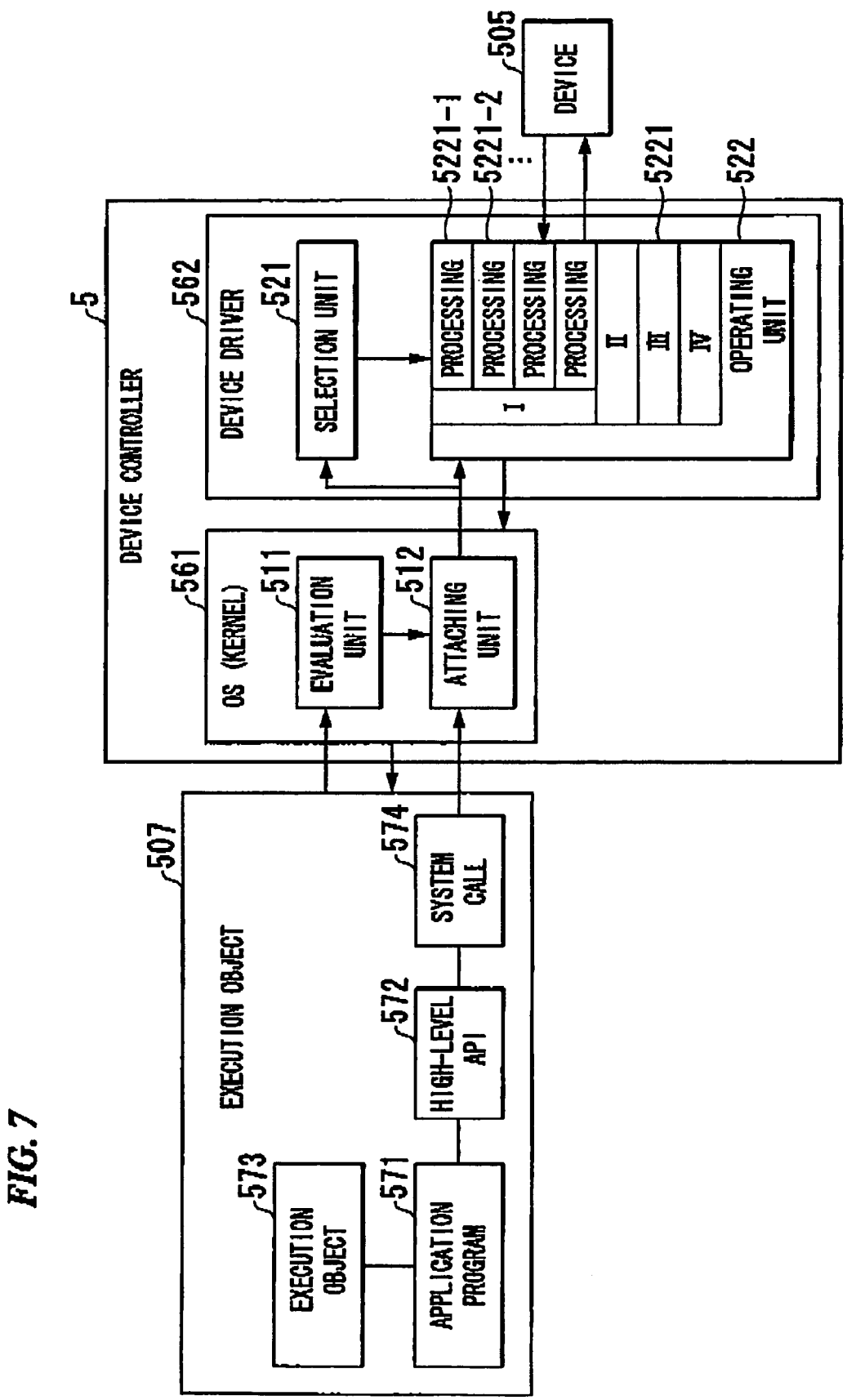
FIG. 7 is a block diagram of a conventional device controller.

FIG. 6 is a flowchart showing a specific example of the flow of the first to fourth procedures shown in FIG. 5. With reference to FIG. 6, the class of the evaluation value included in the indication is checked and a branch operation is performed (S301). It is possible to determine the class easily since the upper 8 bits of the evaluation value represent the class. In the present example, the flow further branches to one of four types of procedures according to the evaluation value. That is, if the class of the evaluation value is Class 1, the first procedure (S302-1) is executed. If the class of the evaluation value is Class 2, the second procedure (S302-2) is executed. If the class of the evaluation value is Class 3, the third procedure (S302-3) is executed. If the class of the evaluation value is Class 4, the fourth procedure (S302-4) is executed.

Since Class 1 is a known object, it is possible to extract information to determine the identity of the object from the indication in the first procedure (S302-1) and to branch to an appropriate procedure. Since Class 2 is an unknown object with a digital signature, reading operations on the device are only permitted when the creator of the signature is the manufacturer of the device in the second procedure (S302-2). If the creator of the signature is a trusted related company, only read operations on the status of the device is allowed. If the creator is a party other than these, only reading operations of limited statuses the public disclosure of which is permitted. Since Class 3 is an unknown safe object, only reading operations of limited statuses the public disclosure of which is permitted in the third procedure (S302-3) because the origin of the object is unknown or the object is determined as safe according to certain determination criteria.

Since Class 4 is an execution object that has been determined as having been tampered with or as unsafe, most of the functionalities are denied in the fourth procedure (S302-4). In some cases, it is possible to notify the device 5 that it is subjected to the unsafe execution object and make the device 5 transition to any suitable protection state. When the device 5 transitions to the protection state, it is possible to take various measures, such as prohibiting an access to a certain service which may charge an expensive charge fee, or prohibiting reading of personal information of the user.

According to such a configuration, it becomes possible to modify the actual operation corresponding to the message according to the indication based on the judgment of the device driver 62. As a result, manufacturers of devices can limit functionalities of the device or deny access to certain functionalities based on the criteria set by the device manufacturer independently from OS developers.

Referring back to FIG. 1, in the above-described embodiment, no determination is made as to whether the message to be sent to the device driver 62 and the indication have been truly created by the evaluation unit 611 and the OS 61. Thus, it seems that a malicious application can operate the device by directly linking the device driver 62 as a DLL. However, the kernel of the OS 61 firstly links the device driver 62, and the device driver instance that has been linked later can recognize that it is not the first instance and can deny its operation.

Furthermore, further ensuring safety is important, and in step S103 in which the OS 61 sends the message and the indication to the device driver 62 (see FIG. 4), it is possible to attach a digital signature that indicates that they were created by the evaluation unit 611 and the OS 61 and have not been tampered with. The device driver 62 can verify the fact. In this case, the OS 61 may attach consecutive numbers or pseudorandom numbers to the message and the indication, create hashes of the three pieces of information, and send them to the device driver 62 after encrypting with a private key of the OS 61 (by an authentication attachment section). The device driver creates hashes of the pieces of information received, decrypts the received encrypted data 1 using a public key of the OS 61, and compares the hashes by matching them to verify that there is no tampering (by the determination section). If a received message is tampered with, the device driver 62 transitions to the protection mode since it is highly likely that the device is subjected to an unauthorized attack to operate the device (by the protection section). In the protection mode, messages from the execution object are all ignored and the security level setting may be enhanced. Furthermore, it is possible to prompt the OS 61 to take protective measures. It should be noted that when the private key of the OS 61 is stored while being encrypted by another key, it is possible to reduce the risk of the private key being stolen by a malicious application.

Furthermore, the program according to the present invention can be recorded in a computer-readable recording medium and distributed, and may be distributed in a manner in which only a part of the functionalities are realized. For example, the program of the present invention may be distributed as a differential program that can realize certain functionalities in combination with a program for an existing system that has been recorded in a computer system.

Furthermore, the above-described computer-readable recording medium includes storage apparatuses, such as a hard disk and other nonvolatile storage apparatuses, and the like, in addition to storage media, such as portable magnetic disks magneto-optical disks. Furthermore, the program of the present invention may be supplied to another computer system via any transmission medium, such as the Internet or any other networks. In this case, the term "computer-readable recording medium" includes any media that contain the program for a certain period of time on a transmission medium, such as volatile memories of computer systems serving as a host or a client computer.

While preferred embodiments of the invention have been described and illustrated above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, although some embedded devices have an operating system that is not equipped with any memory protection features, such as the user mode or the kernel mode, the present invention may be applicable to such cases. Furthermore, some OSs do not have a multi-process functionality. However, even in such cases, because such OSs manage execution objects as execution units for executing application programs, the present invention may be effectively applied by looking up a component object group within an execution object according to a management scheme specific to each OS.

What is claimed is:

1. A computer for controlling a device, comprising:
a sending section that sends a message from an execution object with an indication attached to a control section
wherein the sending section comprises:
an evaluation section that generates an indication indicating reliability of the execution object in response to receiving the message from the execution object; and
an indication attachment section that attaches the indication to the received message,
wherein the control section comprises:
a storage section that stores a plurality of procedures operating the device corresponding to indications, and wherein
the control section is configured to check the indication attached to the message in response to receiving the message, and to selectively execute a procedure operating the device, corresponding to the message and the indication, from the plurality of procedures operating the device stored in the storage section,
in a case that the procedure is a first procedure among the plurality of procedures operating the device, the procedure is selected in response to the indication, and
in a case that the procedure is a second procedure among the plurality of procedures operating the device, the procedure is not selected in response to the indication.

2. The computer according to claim 1, wherein
the sending section further comprises an authentication attachment section that attaches an authentication to the message sent to the control section, and
the control section determines a validity of the authentication in response to receiving the message from the sending section, and protects from an execution object when the validity of the authentication is not established.

3. A method for controlling a device, the method being performed by a processor, the method comprising:
generating an indication indicating reliability of an execution object in response to receiving a message from the execution object;
sending the message to which the indication indicating reliability of the execution object is attached;
looking up the indication indicating reliability of the execution object in response to receiving the message to which the indication indicating reliability of the execution object is attached; and
selecting a procedure operating the device, corresponding to the message and the indication indicating reliability of the execution object, from a plurality of stored procedures for operating the device, to be executed according to a reliability of the execution object, wherein
in a case that the procedure is a first procedure among the plurality of procedures operating the device, the procedure is selected in response to the indication, and
in a case that the procedure is a second procedure among the plurality of procedures operating the device, the procedure is not selected in response to the indication.

4. A non-transitory computer-readable recording medium storing a program causing a computer to execute a process, the process comprising:
receiving a message related to an operation of a device from an execution object;
generating an indication indicating a reliability of the execution object that sends the message;
attaching the indication to the received message;

sending the message with the indication attached to a device driver;
looking up the indication attached to the message with the device driver; and
selecting a procedure operating the device, corresponding to the message and the indication, from a plurality of procedures stored by the device driver for operating the device, according to the reliability of the execution object, wherein
in a case that the procedure is a first procedure among the plurality of procedures operating the device, the procedure is selected in response to the indication, and
in a case that the procedure is a second procedure among the plurality of procedures operating the device, the procedure is not selected in response to the indication.

5. A non-transitory computer-readable recording medium storing a program causing a computer to execute a process, the process comprising:
receiving a message to which is generated and attached an indication indicating a reliability of an execution object that sends a message related to an operation of a device;
looking up the indication indicating reliability of the execution object attached to the message and selecting an operation procedure operating the device, corresponding to the message and the indication indicating reliability of the execution object, from a plurality of operation procedures operating the device that are set according to the reliability of the execution object for each message; and
operating the device according to the selected operation procedure, wherein
in a case that the operation procedure is a first procedure among the plurality of operation procedures operating the device, the operation procedure is selected in response to the indication, and
in a case that the operation procedure is a second procedure among the plurality of operation procedures operating the device, the operation procedure is not selected in response to the indication.

\* \* \* \* \*